(12) United States Patent
Sukkaew et al.

(10) Patent No.: US 12,153,982 B2
(45) Date of Patent: Nov. 26, 2024

(54) CARD-TYPE INFORMATION SUBSTRATE INCLUDING A FRAME AND A PRE-FORM THEREOF

(71) Applicant: LINXENS HOLDING, Mantes-la-Jolie (FR)

(72) Inventors: Watchara Sukkaew, Phra Nakorn Si Ayutthaya (TH); Apartsara Tantrapiwat, Phra Nakorn Si Ayutthaya (TH); Anupont Phakping, Phra Nakorn Si Ayutthaya (TH)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 17/768,768

(22) PCT Filed: May 18, 2020

(86) PCT No.: PCT/IB2020/000500
§ 371 (c)(1),
(2) Date: Apr. 13, 2022

(87) PCT Pub. No.: WO2021/074680
PCT Pub. Date: Apr. 22, 2021

(65) Prior Publication Data
US 2024/0111986 A1    Apr. 4, 2024

(30) Foreign Application Priority Data
Oct. 18, 2019   (WO) ................ PCT/IB2019/001183

(51) Int. Cl.
G06K 19/077    (2006.01)

(52) U.S. Cl.
CPC . *G06K 19/07722* (2013.01); *G06K 19/07724* (2013.01); *G06K 19/07769* (2013.01); *G06K 19/07771* (2013.01); *G06K 19/07773* (2013.01)

(58) Field of Classification Search
CPC ....... G06K 19/07769; G06K 19/07722; G06K 19/07724; G06K 19/07771; G06K 19/07773
See application file for complete search history.

(56) References Cited

U.S. PATENT DOCUMENTS

| 5,690,773 A | 11/1997 | Fidalgo et al. |
| 6,471,128 B1 * | 10/2002 | Corcoran ............... B42D 25/47 235/493 |

(Continued)

FOREIGN PATENT DOCUMENTS

| CN | 107851208 A | 3/2018 |
| KR | 20160057281 A | 5/2016 |
| WO | 2021074680 A1 | 4/2021 |

OTHER PUBLICATIONS

International Search Report and Written Opinion of related International Application No. PCT/IB2020/000500, dated Sep. 18, 2020, 16 pages.

*Primary Examiner* — Daniel I Walsh
(74) *Attorney, Agent, or Firm* — DITTHAVONG, STEINER & MLOTKOWSKI

(57) ABSTRACT

The present invention relates to card-type information substrates, such as payment cards, and a pre-form thereof, in which a frame, in some embodiments in combination with a metal containing plate, is implemented so as to impart increased weight and/or superior appearance to the card-type substrates, wherein the influence of the frame and the metal containing plate, if provided, on the RF performance of the card-type substrate is taken into consideration. For example, (Continued)

in illustrative embodiments the influence of a conductive material in the frame and/or the plate is reduced by selecting one or more appropriate features countering the negative effect on the RF performance.

23 Claims, 6 Drawing Sheets

(56) References Cited

U.S. PATENT DOCUMENTS

| | | | |
|---|---|---|---|
| 10,583,683 B1* | 3/2020 | Ridenour | B42D 25/23 |
| 10,906,287 B2* | 2/2021 | Cox | B32B 9/045 |
| 11,755,873 B1* | 9/2023 | Finn | G06K 19/07749 |
| | | | 235/492 |
| 2007/0141760 A1* | 6/2007 | Ferguson | H01L 21/50 |
| | | | 257/E23.178 |
| 2011/0068178 A1 | 3/2011 | Gebhart | |
| 2012/0038141 A1* | 2/2012 | Michalk | B42D 25/45 |
| | | | 428/173 |
| 2012/0201994 A1* | 8/2012 | Michalk | G06K 19/07718 |
| | | | 428/68 |
| 2013/0154885 A1* | 6/2013 | Schindler | G06K 19/07779 |
| | | | 156/247 |
| 2015/0021403 A1 | 1/2015 | Finn et al. | |
| 2015/0269477 A1 | 9/2015 | Finn et al. | |
| 2016/0110639 A1 | 4/2016 | Finn et al. | |
| 2017/0091494 A1* | 3/2017 | Dabrowski | G06K 7/10198 |
| 2018/0339503 A1* | 11/2018 | Finn | H01Q 1/2225 |
| 2019/0042904 A1* | 2/2019 | Hong | G06K 19/07722 |
| 2019/0114526 A1* | 4/2019 | Finn | H01Q 21/29 |
| 2019/0286961 A1* | 9/2019 | Lowe | G06K 19/07718 |
| 2020/0005114 A1* | 1/2020 | Finn | H01Q 1/2225 |
| 2020/0151534 A1* | 5/2020 | Lotya | G06K 19/07722 |
| 2020/0250504 A1* | 8/2020 | Lotya | G06K 19/02 |
| 2021/0117744 A1* | 4/2021 | Finn | G06K 19/07769 |
| 2021/0150294 A1* | 5/2021 | Finn | G06K 19/045 |
| 2021/0174159 A1* | 6/2021 | Finn | G06K 19/0726 |
| 2021/0182650 A1* | 6/2021 | Lotya | H04B 5/22 |
| 2021/0192312 A1* | 6/2021 | Lotya | H01Q 1/2283 |
| 2021/0216838 A1* | 7/2021 | Finn | G06K 19/07773 |
| 2021/0350198 A1* | 11/2021 | Finn | G06K 19/07722 |
| 2022/0027702 A1* | 1/2022 | Kang | G06K 19/07747 |
| 2022/0414406 A1* | 12/2022 | Finn | G06K 19/0723 |
| 2023/0086189 A1* | 3/2023 | Finn | G06K 19/07769 |
| | | | 235/488 |
| 2023/0169297 A1* | 6/2023 | Atkins | G06K 19/07732 |
| | | | 235/492 |
| 2023/0366752 A1* | 11/2023 | van Niekerk | G06K 19/0717 |
| 2023/0385590 A1* | 11/2023 | Lowe | G06K 19/07722 |
| 2023/0409861 A1* | 12/2023 | Baldischweiler | G06K 19/07749 |
| 2024/0131833 A1* | 4/2024 | Cox | B32B 27/08 |
| 2024/0176977 A1* | 5/2024 | Minks | G06K 19/07722 |

* cited by examiner

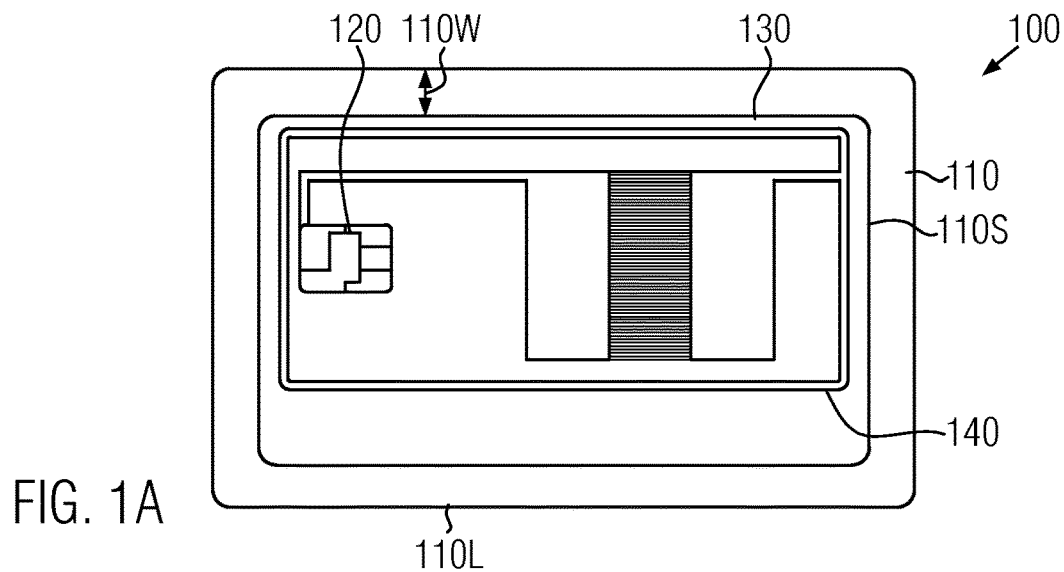
FIG. 1A
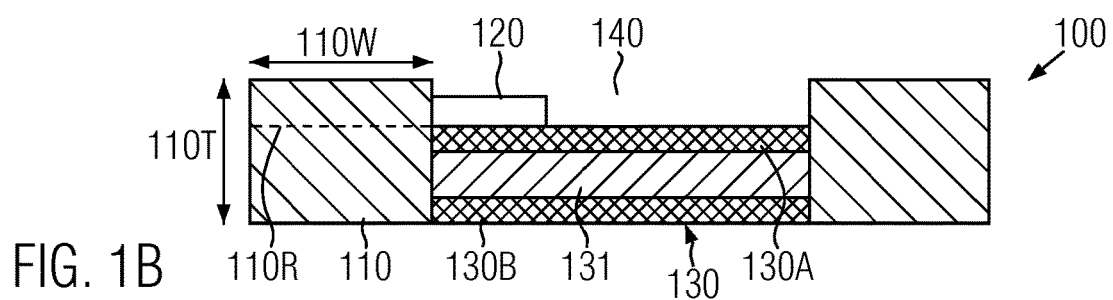
FIG. 1B
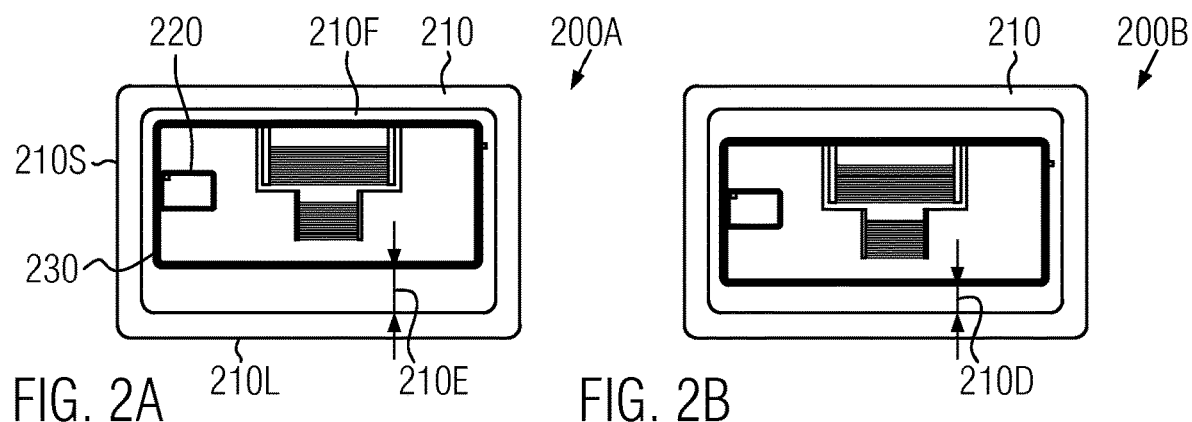
FIG. 2A
FIG. 2B
FIG. 2C

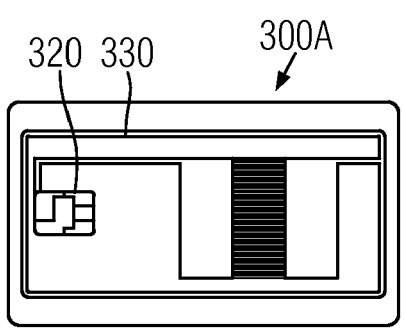
FIG. 3A
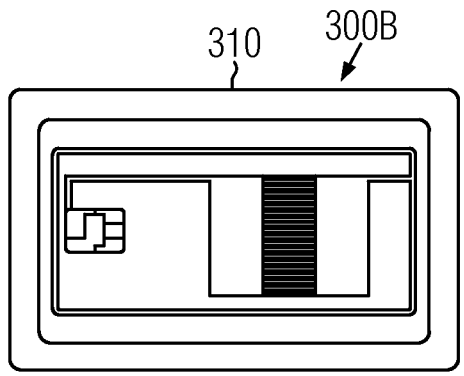
FIG. 3B
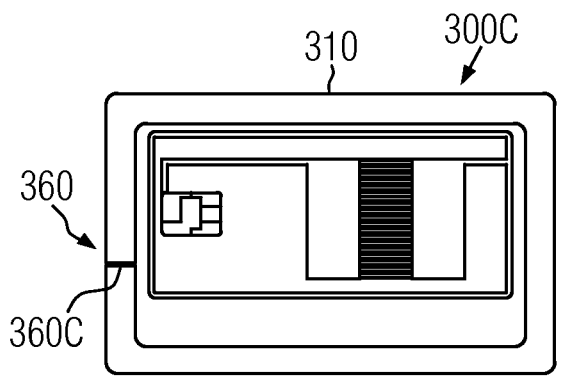
FIG. 3C
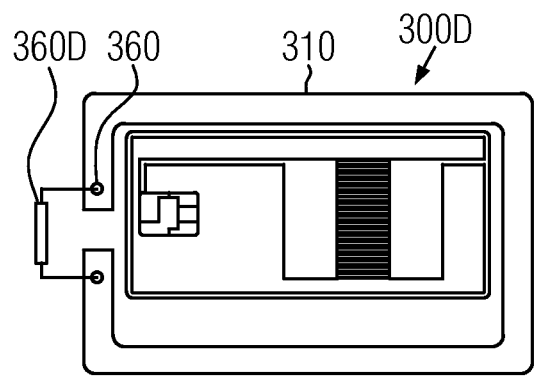
FIG. 3D
| Fig. | Configuration | Frequency (MHz) | S11 (dB) | EMVCo pass rate |
|---|---|---|---|---|
| 3A | No metal | 13.3 | -7.3 | 89/91 |
| 3B | With metal | 14.2 | -1.9 | 77/91 |
| 3C | With metal (Slit) | 13.3 | -6.9 | 89/91 |
| 3D | Filled with Resitor | 13.3 | -4.6 | 90/91 |
FIG. 3E ered device, thereby, however, significantly restricting usable lifetime due to wear and tear of the contacts and also limiting user experience due to the lack of wireless connectivity.

In view of the situation described above, it is an object of the present invention to allow superior external appearance and/or weight of a card-type information substrate while at the same time increasing flexibility with respect to wireless connectivity capabilities of the card-type information substrate.

CARD-TYPE INFORMATION SUBSTRATE INCLUDING A FRAME AND A PRE-FORM THEREOF

TECHNICAL FIELD

The present invention generally relates to card-type information substrates, such as cards used for payment activities, and the like, which include wireless information exchange capability by wireless interaction with a corresponding reader device.

BACKGROUND

In many technical fields, wireless information exchange is taken advantage of in order to provide superior handling of information carriers and allow enhanced functionality. For example, a growing number of transactions, such as payment transactions, and the like, may be accomplished or at least triggered on the basis of specifically designed information substrates, which may contain sensitive user information as well as the technological platform required for initiating a corresponding transaction. For example, respective payment cards of any type may be typically used for initiating financial transactions or any other activities requiring the exchange of sensitive user information with a respective counter part device, wherein increasingly wireless information exchange by radio-frequency (RF) is relied on. That is, although many conventional payment cards, as one example of card-type information substrate, may still be based physical contact of a corresponding electronic module provided within the card base material and exposing contact pads for interacting with respective contact pads of a reader device, additionally or alternatively such payment cards are increasingly equipped with a respective antenna for wirelessly interacting with the respective reader device. Consequently, specific RF characteristics may have to be implemented and dedicated specifications have to be met in order for a respective payment card to be usable in combination with standardised reader devices.

In addition to steadily increasing technological capabilities of any such card-type information substrates, such as payment cards, other characteristics thereof have to respect certain requirements in order to meet user expectations with respect to handling and optical appearance of these information substrates. For example, such card-type information substrates may have to exhibit a significant mechanical robustness so as to withstand mechanical stress, such as bending forces, and the like, over an extended period of time. Moreover, in general the substrate itself may have to exhibit a high degree of tamper resistance so as to substantially avoid the possibility of unintended change of information and/or functionality of the card-type substrate. In addition to any such requirements, also optical and haptic appearance of the card-type substrate is increasingly gaining in importance in order to provide for competitiveness of such substrates.

For example, frequently metal components, such as metal pads, and the like are added to the card base material so as to impart increased weight or superior outer appearance to card-type substrates. In still other approaches respective card-type information substrates are formed on the basis of a metal base material, thereby achieving heavy weight and a specific outer appearance, which may result in conveying presence of superior value of the corresponding payment card. Typically, such metal-based payment cards are designed for contact-based coupling to a corresponding

DISCLOSURE OF INVENTION

In view of the situation described above the present invention is generally based on the technical concept that additional weight and/or superior appearance may be imparted to card-type information substrates by providing a frame, which is made of a different material as a card base material in order to add at least additional weight to the card, without changing the specified outer dimensions of the card-type substrate. Moreover, the card-type information substrate may still be provided with wireless connectivity capabilities irrespective of the type of material used in the card frame. In illustrative embodiments, one or more heavy components, such as metal containing plates or slugs, may be additionally incorporated so as to enhance the weight and/or optical effects that may be achieved on the basis of the frame made of heavy material.

In one aspect of the present invention therefore the above-specified technical object is solved by a card-type information substrate. The card-type information substrate includes a substrate material made of plastic and an electronic module that is embedded in the substrate material. Furthermore, the card-type information substrate includes a frame that is formed around the perimeter of the substrate material, wherein the frame imparts increased weight and/or superior appearance to the card-type information substrate. Additionally, the card-type information substrate includes an antenna that is positioned within an outline of the frame and that is operatively connected to the electronic module to perform wireless communication.

It should be noted that the frame may be connected to the substrate material by direct connection or by means of any intermediate agent.

According to this aspect of the present invention the dimension, shape and the material composition of the frame may be selected so as to achieve increased weight and/or superior appearance, which may be accomplished by using an appropriate type of material or materials and incorporating the material(s) into the card base material on the basis of an appropriately selected configuration.

In this respect it should be appreciated that increased weight is to be understood as a difference in weight of the inventive card-type substrate having formed therein the frame compared to a substantially identical card-type substrate, in which the frame would be replaced by the base material of the remainder of the card-type substrate. That is, the volume occupied by the frame material has a greater weight compared to the substrate material made of plastic for otherwise identical overall dimensions of the card-type substrate. To this end, any appropriate materials may be used, which may have basically a higher specific weight compared to the substrate material in the form of plastic, wherein typically many of such appropriate frame materials may additionally impart superior mechanical robustness to the card-type information substrate compared to the situation, in which the substrate material in the form of plastic would be used throughout the entire card.

Furthermore, it is to be appreciated that the term "frame" is to be understood as a component that encloses at least a significant portion of the substrate material, while still leaving a significant central area that is not covered by the frame material. For example, a width of the frame, although in some embodiments it may vary along the circumferential direction, may be restricted to approximately 3 to 25% of the total extension of the smaller one of the two orthogonal lateral dimensions of the card-type substrate. For example, for a card-type substrate having a length, as the greater one of the two lateral dimensions, of approximately 85.6 mm and a width, as the smaller one of the two lateral dimensions, of approximately 54.0 mm, the width of the frame may be in the range of approximately 2 mm to 13.5 mm.

Consequently, by applying the concept of providing a frame for the card-type substrate respective desired characteristics of any such appropriate frame material may be taken advantage of while still providing sufficient area for implementing the electronic module and the antenna within the outline of the frame. That is, upon selecting an appropriate geometric configuration of the frame in combination with providing a desired frame material the overall size of the inner area enclosed by the frame may appropriately be designed so as to accommodate the electronic module and the antenna having the required RF characteristics. For example, when maximizing the card internal area enclosed by the frame the dimensions of the antenna may be appropriately adapted, thereby providing sufficient area for an antenna design that results in sufficient RF performance of the antenna.

In a further illustrative embodiment the card-type information substrate includes an eddy current restriction component that is configured and arranged to restrict eddy currents in the frame. In this embodiment, the characteristics of many types of materials are taken into consideration with respect to their RF performance hampering behaviour. For example, certain materials of even low conductivity may exhibit a tendency for creating eddy currents when exposed to an electromagnetic field of a certain frequency range. For instance, many standardised payment cards may operate in a frequency range of approximately 11 to 20 MHz, which may result in respective eddy currents generated in the frame material, which in turn may negatively affect the radio frequency performance of the antenna.

In this respect it should be appreciated that the term eddy current is to be understood as having the meaning of including any physical mechanism resulting in losses of electromagnetic radiation emitted or received by the antenna due to the presence of the frame material. Consequently, by taking into consideration the possibility of the creation of eddy currents in the frame material the eddy current restriction component may appropriately be adapted so as to avoid or at least restrict the amount of dampening and thus the magnitude of eddy currents to an acceptable level.

In one illustrative embodiment at least a portion of the frame is formed of a conductive material. As already discussed in the introductory part of the description metal materials are frequently used in conventional payment cards so as to increase weight and enhance appearance of such cards. Consequently, by using a metal material or materials at least in one portion of the frame may therefore provide for the possibility of appropriately designing the weight and/or the outer appearance of the card-type substrate, wherein, however, any negative influence of the metal material(s) on the RF performance of the antenna may be taken into consideration by design and/or other mechanisms, such as the eddy current restriction components discussed above.

In a further illustrative embodiment, the frame is formed of a non-conductive material, which, in one illustrative embodiment, may be provided in the form of ceramic. In this manner, the desired features of a frame in accordance with the present invention may be obtained, such as increasing weight and/or enhancing appearance of the card-type substrate, while substantially not negatively affecting the RF performance of the antenna. In one illustrative embodiment, the frame may be completely made of ceramic or any other appropriate nonconductive material without any intermediate conductive or metallic portions, thereby minimizing an influence on the RF performance of the antenna.

In a further illustrative embodiment the eddy current restriction component, discussed above, includes a slit that is formed in the frame. That is, in this illustrative embodiment the frame may be "interrupted" by a slit, but may otherwise completely enclose the substrate material of the card-type substrate. In this case, it has been recognized that even for conductive frame materials respective dampening mechanisms, i.e. eddy currents, may sufficiently be restricted so as to still provide for a required RF performance of the antenna. A width of the slit, i.e., the dimension of the slit along a circumferential direction of the frame, may be selected so as to obtain the required eddy current restricting functionality, while still achieving the desired optical and mechanical behaviour of the frame.

In a further illustrative embodiment the eddy current restriction component, as discussed above, includes a resistive portion that is connected to the frame and that has a lower specific conductivity compared to the conductivity of a base material of the frame. That is, the resistive portion may physically and/or electrically be connected to the frame so as to reduce the overall conductivity of the frame, which in turn may result in a reduction of any dampening mechanisms, i.e. eddy currents that may otherwise be generated in the frame in significant amounts during operation of the antenna.

In one illustrative embodiment, the resistive portion may include a slit in combination with a fill material that exhibits reduced conductivity. In this manner, the resistive portion is provided as portion physically connected to the frame and thus representing a part of the frame, while nevertheless reducing overall conductivity of the frame, even if the remaining portion of the frame may be formed of a metal or any other conductive material. In this manner, a substantially closed loop may be provided in the form of the frame based on any appropriate frame base material, while nevertheless the resistive portion(s) provide(s) for reduced losses upon operating the antenna. As already indicated, therefore the resistive portion(s) may represent a part of the frame, which in turn may thus be provided as a closed loop, thereby increasing overall mechanical robustness and also providing for superior outer appearance of the frame.

In other illustrative embodiments the frame is at least partially conductive and has a total conductivity that corresponds to a conductivity of 50 S/m (Siemens per meter) or less. As discussed above, using conductive materials as a base for the frame may be advantageous in some respects, for instance in terms of creating additional weight with a reduced amount of frame material and/or achieving a desired appearance of the frame by using certain alloys, and the like providing specific optical effects, while nevertheless the overall conductivity may be controlled to the above-specified value range in order to maintain the loss mechanisms at a low level so as to still achieve the required RF performance of the antenna. For example, the frame may be made of a base material having a conductivity of 50 S/m or less without requiring any other materials of reduced conductivity, thereby achieving consistent material characteristics along the entire circumferential extension of the frame, while still ensuring appropriate RF performance of the antenna.

In still other illustrative embodiments the frame is, in total, conductive and includes at least one portion of reduced conductivity so as to obtain the desired total conductivity as specified above. In this manner, a high degree of flexibility is provided in establishing a desired total conductivity while on the other hand enabling the usage of a number of conductive materials i.e. of materials of increased conductivity, while adjustment of the total conductivity may still be reliably insured by providing the at least one portion of reduced conductivity.

In one illustrative embodiment the at least one portion of reduced conductivity includes a region of reduced material thickness. In this manner, a desired total conductivity may readily be adjusted for many types of conductive materials, while a consistent optical appearance may be maintained at least at one surface of the frame.

In illustrative embodiments the antenna is a planar antenna formed of metal traces, which are formed on a carrier material. In this manner, established manufacturing techniques may be applied so as to obtain a desired type of overall antenna configuration for a planar architecture. For example, techniques for selectively depositing material, non-selective deposition techniques in combination with lithography processes and etch techniques, and the like may be used, thereby enabling the generation of even highly complex antenna geometries on the basis of cost-efficient manufacturing techniques that insure minimal process variations and, thus, result in reproducible RF behaviour.

In still other illustrative embodiments the antenna is formed of a wire that is embedded in a carrier material. Consequently, any such "wire embedded" configurations for an antenna may also efficiently be implemented into the card-type information substrate, since the RF behaviour may be adjusted on the basis of techniques as discussed above by adapting frame configuration to the specific antenna design.

In further illustrative embodiments the operative coupling between the electronic module and the antenna is established by a direct electrical, i.e. a wired, connection between the antenna and the electronic module. That is, in these embodiments a wired connection is established between the electronic module and the antenna, thereby contributing to reduced overall losses of the entire system composed of the electronic module and the antenna provided within the outline of the frame. Consequently, electronic modules without having incorporated therein a module internal coupling antenna may be used, which may per se provide for superior overall RF performance of a module-antenna system established for wireless information exchange with an external reader device.

In still other illustrative embodiments the operative coupling between the electronic module and the antenna is established by inductive coupling between the antenna and the electronic module. In this manner, well-established electronic modules having incorporated therein the coil for inductive coupling may be used, while the required RF performance of the antenna for communicating with an external reader device may still be achieved based on the techniques as discussed above, even though the antenna is provided within the outline of the frame.

In further illustrative embodiments of the present invention the card-type information substrate has two opposing long sides, wherein the antenna is arranged symmetrically with respect to the two opposing long sides. Thus, by a corresponding design, in which symmetry with respect to the long sides of the card is taken into consideration, generally the influence of the frame on the antenna may be reduced, even if the frame contains conductive materials, such as metals. In this respect, the symmetry of the antenna with respect to the long sides of the substrate is to be understood as referring to a configuration, in which the distances of the respective antenna long sides to the respective adjacent long sides of the substrate are equal. That is, the antenna is centred with respect along the width dimension of the substrate.

In one illustrative embodiment, a distance of the antenna from the two opposing long sides is at least 6 mm. It has been recognized by the inventors that when applying standard dimensions in the lateral and thickness dimensions for the card-type information substrate, as are typically used for payment cards and the like, a distance of at least 6 mm may result in a significant improvement of the RF performance of the antenna. Consequently, by appropriately adapting the dimensions of the frame, as already discussed above, the available area of the card that is enclosed by the frame may be adjusted such that for a given lateral size of the antenna the distance as specified above may be obtained.

In illustrative embodiments disclosed herein, the card-type information substrate is a payment card having standard dimensions. That is, in these illustrative embodiments the frame may advantageously be implemented in a standard payment card, while still ensuring efficient wireless information exchange capability with an external reader device, for instance by complying with established RF standards for wireless communication in the field of payment cards.

It should be appreciated, however, that the principles disclosed herein may also be used in combination with other card-type substrates with differing dimensions when the implementation of any such differing lateral dimensions and/or thickness dimensions may become necessary in certain applications.

According to another aspect of the present invention, the above-referenced technical object is solved by a pre-form of a card-type information substrate. The pre-form includes a frame formed around the perimeter of a base material, wherein the frame imparts increased weight to the pre-form. Furthermore, the pre-form includes at least one metal containing plate that is provided within an outline of the frame. Moreover, the pre-form includes an antenna that is positioned within the outline of the frame and is configured to enable wireless communication.

According to this concept the present invention provides for a pre-form of a card-type information substrate, which includes, in addition to a weight-increasing frame, an additional component made of a heavy material, thereby increasing the overall effect on the final card-type information substrate. By providing respective heavy components for a card-type information substrate as a pre-form, which may have to still undergo specific manufacturing processes, such as laminating one or more additional material layers, significant advantages may be gained, since the pre-form enables a substantially standard manufacturing procedure for the completion of the card-type information substrate without requiring specifically designed manufacturing processes. Furthermore, as also discussed above and as will be discussed in the following, the heavy components such as the frame and the at least one metal containing plate or slug may be designed and arranged such that a desired performance for wireless communication on the basis of the antenna may be achieved.

In an illustrative embodiment, the frame contains a metal material, thereby also achieving similar effects as already discussed above. For example, by including a metal material into at least some portions of the frame the pre-form may be endowed with superior stability and/or optical appearance and/or weight and/or haptic characteristics, thereby achieving, in combination with the metal containing plate, a respective desired final configuration.

In a further illustrative embodiment the pre-form further includes a first disconnecting layer that covers, at a first surface of the pre-form, the frame, the base material, the at least one metal containing plate and the antenna. Therefore, the disconnecting layer may result in improved surface appearance, since different components in the body of the final card-type substrate will not be visible due to different heat dissipation of components. Moreover, the first disconnecting layer may provide for a larger process window for production of the card-type substrate, since, for example, heat during card manufacturing (lamination process) will have less effect on the surface quality. A further effect of the first disconnecting layer is improved card haptic, since, for instance, when using e.g. epoxy glass tape, the card, that is, the final card-type information substrate, will have higher flexibility (spring back effect) when bended and the bending is not plastic (destructive), whereas otherwise, when just having the frame made of SST, the frame will stay warped/bent. Similarly, the card-type substrate itself may remain deformed, when the card-type substrate is bent during handling.

Furthermore, the first disconnecting layer may act as kind of "heat blocker" to protect outer layers still to be made from plastic during card production when e.g. milling the card at the metal during card production (card singulation process). Milling generates heat. That is, the disconnecting layer may thus provide for appropriate surface characteristics of the pre-form in order to account for differences of different materials and different material properties in the pre-form during the further manufacturing processes, which may be required for completing the card-type information substrate. In this sense, the disconnecting layer may basically "decouple" the pre-form from the remaining components still to be attached to the pre-form so as to obtain the desired card-type information substrate. As a consequence, the disconnecting layer may enable the further processing of the pre-form on the basis of substantially standardised lamination processes, i.e. processes for attaching one or more material layers or material sheets by applying increased pressure and elevated temperatures without substantially being affected by the "core" materials of the pre-form.

The disconnecting layer may be attached to the "core" components of the pre-form by means of a first adhesive layer, thereby providing for a robust physical connection between the core components and the first disconnecting layer.

In a further illustrative embodiment the pre-form includes a second disconnecting layer that covers, at a second surface of the pre-form opposite to the first surface, the frame, the base material and the at least one metal containing plate. Consequently, by providing the second disconnecting layer similar advantages may be achieved at the opposite surface of the preform with respect to the further processing of the pre-form, as discussed above in the context of the first disconnecting layer.

Also in this case, the second disconnecting layer may be attached by means of a second adhesive layer.

Moreover, in further illustrative embodiments the pre-form may have similar features and configurations with respect to adaptation to RF performance, as is also discussed above in the context of the frame of the card-type information substrate. That is, the frame of the preform is, in some embodiments, at least partially formed of a conductive material, such as stainless steel, thereby providing the effects and advantages, as discussed above.

Similarly, the frame of the pre-form is, in some illustrative embodiments, formed of a non-conductive material, such as ceramic, so as to contribute to increased overall weight of the pre-form, while affecting the RF performance in a less pronounced manner.

Moreover, as discussed above, an eddy current restriction component is provided in the preform according to illustrative embodiments, wherein the eddy current restriction component is configured and arranged so as to restrict eddy currents in the frame and/or the metal containing plate. Consequently, in this manner eddy currents may be reduced in the frame and/or the metal containing plate, thereby also reducing RF losses of the antenna of the preform, in a similar manner as discussed above in the context of the frame of the card-type information substrate.

In illustrative embodiments, the eddy current restriction component includes one or more slits formed in the frame and/or the metal containing plate. In this manner, the occurrence of eddy currents and, thus, the occurrence of undue RF losses may be reduced without substantially affecting the overall appearance, size and shape of the frame and/or the metal containing plate.

In one illustrative embodiment the eddy current restriction component includes a resistive portion connected to the frame and/or the metal containing plate that has a lower specific conductivity compared to a conductivity of a remaining material of the frame and/or the metal containing plate. As a consequence, by providing the resistive portion a reliable mechanism is implemented for reducing eddy currents and, thus, RF losses without substantially affecting the overall configuration of the frame and/or the metal containing plate. For example, the resistive portion may be implemented on the basis of one or more slits and a fill material of reduced conductivity, thereby enabling the provision of the frame and/or the metal containing plate as a mechanical single component, while nevertheless significantly reducing eddy currents.

According to some illustrative embodiments, the resistive portion is provided as part of the frame and/are the metal containing plate so as to allow the provision of the frame and/or the metal containing plate as a single component having already incorporated therein the resistive portion.

In other illustrative embodiments, the frame forms a closed loop, thereby providing a highly mechanically stable edge of the pre-form prior to being processed into a respective card-type information substrate.

In other illustrative embodiments, the metal containing plate is a continuous single piece of material. In this manner, the process of manufacturing the pre-form is simplified, since the metal containing plate as a single component may readily be produced in a separate fabrication process and may be incorporated into the pre-form, for instance by being laterally attached to the base material, and the like.

In other illustrative embodiments, the metal containing plate includes two or more metal containing plates. In these embodiments the two or more metal containing plates may be arranged side-by-side so as to implement a reduced contact surface or avoid any direct contact at all, thereby also significantly contributing to reduced overall conductivity and thus reduced eddy currents.

In further illustrative embodiments, the frame and/or the metal containing plate are conductive and include at least one portion of reduced conductivity. Also in this case, respective RF losses may be reduced due to providing for increased resistance for any eddy currents induced by RF radiation.

In one illustrative embodiment, the at least one portion of reduced conductivity includes a region of reduced material thickness. In this manner, a desired overall conductivity of the frame and/or the metal containing plate may be readily adjusted by selecting the reduced material thickness, the size and the shape of the portion of reduced material thickness. For example, material may be removed from the frame and/or the metal containing plate by grinding, drilling, etching, and the like, so as to locally obtain a reduced material thickness.

In some illustrative embodiments, the metal containing plate contains tungsten as a metal, thereby contributing to a significant weight increase due to the high weight of tungsten.

Generally, in some illustrative embodiments the design and the characteristics of the frame, the metal containing plate(s) and the antenna may be tuned so as to achieve a required minimum RF performance that is sufficient for a desired performance of wireless communication with an external reader device, while any further modifications, such as described above, may not be required.

According to a further aspect of the present invention the above-referenced object is solved by a card-type information substrate that comprises a substrate material made of plastic and an electronic module that is provided in the substrate material. Additionally, the card-type information substrate includes a pre-form, as discussed above or as will be discussed later on in the detailed description, wherein the pre-form is attached to the substrate material and the antenna of the pre-form is operatively connected to the electronic module in order to perform wireless communication.

The above-referenced technical object is also solved by a method of forming a card-type information substrate. The substrate comprises a frame, an antenna for wireless communication and an electronic module that is operatively connected to the antenna. The method includes determining at least one metric that represents a desired radio frequency performance of the antenna. Moreover, the method includes selecting a total conductivity of the frame and/or a position of the antenna within an outline of the frame and/or performance of the electronic module on the basis of the at least one metric so as to achieve the desired radio frequency performance.

In this aspect of the present invention the presence of the frame in the card-Information substrate may be estimated by determining the metric representing the radio frequency performance of the antenna. That is, the influence of the frame on the radio performance may be assessed on the basis of at least one metric or parameter value that specifies radio frequency performance in the presence of the frame. Based on the required radio frequency performance appropriate measures may be taken so as to tune the actual radio frequency performance of the antenna. To this end, the effect of one or more features, such as the total conductivity of the frame, the tendency of creating eddy currents in the frame, the design of the antenna and the position thereof within the outline of the frame, the RF performance of the electronic module and/or any combinations of these features may be evaluated so as to establish appropriate design and configuration concepts for implementing respective features into the frame and/or the antenna and/or the electronic module so as to approximate the metric determined in advance. A corresponding evaluation of the various measures or features for establishing a required RF performance of the antenna in the presence of the frame may include experiments and/or simulation calculations, which may result in respective parameter values or ranges, which allow approximation to the desired metric within a desired tolerance range.

For example, for conductive materials and for given dimensions of the frame under consideration a respective metric in the form of a maximum allowable total conductivity may be established on the basis of experiments and/or calculations in order to quantify the influence of the design and overall conductivity of the frame on the RF performance of the antenna. Similarly, the overall design and/or the lateral size and/or the lateral distance of the antenna from the frame may be quantified on the basis of appropriate parameters or parameter ranges in order to provide numerical values for estimating the influence on the overall RF performance of the antenna. Likewise, the RF characteristics of the electronic module itself and the type of coupling the electronic module to the antenna, i.e. direct coupling or inductive coupling, may also be evaluated on the basis of experiments and/or simulations in order to obtain the respective numerical parameter values or value ranges. Consequently, upon having determined the desired or required RF performance of the card-type information substrate based on a basic card configuration including a frame and an antenna positioned within the outline of the frame, the respective effects of the individual factors and characteristics affecting the overall RF performance may be taken into consideration by referring to the established parameter values of value ranges. Also, respective mutual correlations of the various parameters may be determined in advance in order to evaluate the combined effect on the RF behaviour and to provide for superior flexibility in designing a respective card-type information substrate.

For example, if a certain minimum width and a certain material composition for the frame are set in advance as desired design criteria, respective RF related parameters previously determined may be referred to, which in combination with parameters representing the frame width and material composition of the frame may allow the estimation of the RF behaviour and therefore result in the desired RF performance without the need of extensive prototyping.

In this manner, having established representative parameters for a number of influences on the RF performance, desired design criteria may be set in advance that have to be met, while the remaining parameters may provide for sufficient flexibility an appropriately adapting other design aspects in order to arrive at the desired RF performance. For instance, if weight and/or external appearance criteria may be set in advance, then other aspects may be selected in accordance with the pre-established parameter values, such as overall conductivity of the metal frame possibly in combination with overall RF performance of the electronic module, possibly in combination with design, configuration and position of the antenna in order to achieve the required RF performance.

In illustrative embodiments, any such parameter matching process may be implemented in a computer device on the basis of an appropriately designed instruction set, wherein respective parameters representing RF relevant features of the card-type information substrate may be stored in a respective database that may be accessed by the respective program instructions. Generally, the respective database may continuously be updated on the basis of experiments, simulations and data obtained from actual cards operated under real life conditions. In this manner the overall process of developing and producing frame-based card-type substrates may be "automated" to a certain degree, thereby increasing reproducibility and thus yield of the manufacturing process.

BRIEF DESCRIPTION OF THE DRAWINGS

Further illustrative embodiments and other aspects of the present invention will be described in more detail in the following specification, while also referring to the accompanying drawings, in which FIG. 1A schematically illustrates a top view of a card-type information substrate according to an illustrative embodiment;

FIG. 1B schematically illustrates a cross-sectional view of the card-type information substrate of FIG. 1A according to one illustrative embodiment;

FIGS. 2A and 2B schematically illustrate top views of configurations with different placement of an antenna with respect to a frame of a card-type information substrate according to illustrative embodiments;

FIG. 2C schematically illustrates a table of parameters or metrics representing the RF performance of the configurations of FIGS. 2A and 2B, respectively;

FIGS. 3A to 3D schematically illustrate top views of card-type information substrates with a frame including an eddy current restricting component according to illustrative embodiments;

FIG. 3E illustrates a table correlating respective RF metrics to the configurations of FIG. 3A two 3D, respectively, according to illustrative embodiments;

DETAILED DESCRIPTION

Figures 4A, 4B:
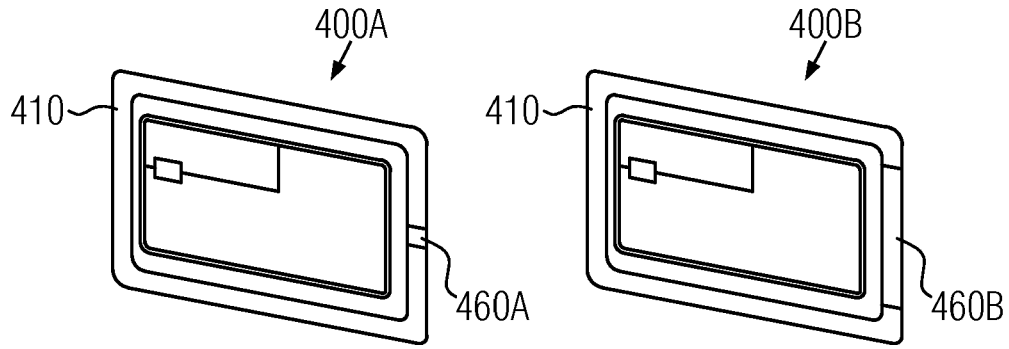
FIGS. 4A and 4B schematically illustrate top views of card-type information substrates with at least one eddy current restricting component having a varying configuration according to illustrative embodiments.

Best Mode(s) for Carrying Out the Invention

With reference to the accompanying drawings further illustrative embodiments of the present invention will now be described in more detail.

FIG. 1A schematically illustrates a top view of a card-type information substrate 100, wherein a card-type substrate is to be understood as a substrate, the lateral dimensions of which are a significantly greater than its dimension in a thickness direction. It should be appreciated that lateral dimensions in FIG. 1A correspond to dimensions within the drawing plane of FIG. 1A, while a thickness direction is a direction perpendicular to the drawing plane of FIG. 1A. For example, the lateral dimensions of the card-type substrate 100 may be several centimetres, while a dimension in the thickness direction may be several millimetres or significantly less, such as several hundred micrometers. In illustrative embodiments, the card-type substrate 100 represents a card used for payment or other transactions, for which dimensions in the lateral directions and in the thickness direction are set by respective standards, established for many types of payment cards, credit cards, and the like.

The card-type substrate 100 includes a substrate material 140, which may typically comprise any type of appropriate plastic, such as polymer materials of various types, such as polycarbonate, PVC materials, and the like. It should be appreciated that the substrate material 140 may typically be provided in the form of several functional layers that are laminated so as to achieve the various requirements for the substrate 100. At least partially embedded in the substrate material 140 there is provided an electronic module 120, which may have implemented therein any required functionality so as to store information, respond to externally supplied signals, and the like. Any such electronic modules are well known in the art and may efficiently be used in combination with the present invention.

Moreover, the card-type substrate 100 includes a frame 110 that is physically connected to the substrate material 140 and/or may be embedded therein, depending on the overall configuration. Basically, the frame 110 imparts additional weight to the card-type substrate 100, as previously discussed, thereby contributing to superior handling of the substrate 100. Furthermore, the frame 110 may contribute to superior outer appearance of the substrate 100, for instance by generating specific optical effects, such as metallic reflection, and the like. As also previously discussed, the frame 110 has a width 110W, which may represent a dimension in a direction that is perpendicular to a circumferential direction of the frame 110. The width 110W, which in some embodiments may vary along the circumferential extension of the frame 110, is selected so as to expose a significant inner area of the card-type substrate 100, thereby enabling the placement of the electronic module 120 and an antenna 130, which is designed so as to enable wireless communication with an external reader device (not shown). To this end, the width 110W is selected to be 3% or less of a selected total lateral dimension of the card-type substrate 100 and up to 25%, such as 15%, or 10% of the smaller one of the lateral dimensions of the substrate 100. For example, in FIG. 1A the card-type substrate 100 has a rectangular configuration in the top view of FIG. 1A with two long sides 110L and two short sides 110S. In this case, the width 110W may be within the range as specified above with the short sides 110S acting as a reference. In some illustrative embodiments the width 110W may vary along the perimeter of the substrate 100. For example, within the above-referenced limits, the width of the frame 110 along the long sides 110L may differ from the width of the frame 100 along the short sides 110S. Also, any other configuration with varying widths of the frame 110 may be realized. For example, the frame 110 may have along a certain portion or along its entire circumferential extension a repetitive or non-repetitive pattern of segments of differing width dimensions, such as an alternating sequence of segments having alternatingly an increased and reduced width, and the like. In this manner, a certain interdigitated configuration with respect to the substrate material 140 may be obtained on the inner perimeter and/or the outer perimeter of the frame 110, thereby increasing mechanical robustness of the connection between the frame 110 and the substrate material 140 and/or contributing to higher flexibility in designing the visual effects of the substrate 100.

Moreover, in the embodiment as shown in FIG. 1A the frame 110 may represent a closed loop and may thus completely enclose the inner area of the card-type substrate 100, while in other cases, as will be discussed later on, the frame 110 may be interrupted at least at one position so as to form an interruption or slit that disconnects the frame 110 along its circumferential extension.

The antenna 130 that is formed within the outline of frame 110, i.e., in the inner area of the card-type substrate 100, is configured to be operatively coupled to the electronic module 120 so as to allow wireless communication of the electronic module 120 with the external reader device.

In some illustrative embodiments, the antenna 130 is provided in the form of a planar antenna formed by conductive traces that are formed on an appropriate carrier material. In other cases, a discrete wire material may be used, wherein respective portions of the wire may be embedded in a carrier material, which may represent a separate carrier material or may represent at least a layer of the substrate material 140.

It should be appreciated, however, that the antenna 130 may be provided in any appropriate form on the basis of any appropriate materials, as long as the design, configuration and placement of the antenna 130 are appropriate for providing the desired RF performance.

FIG. 1B schematically illustrates a cross-sectional view of the card-type substrate 100 of FIG. 1A according to illustrative embodiments. As shown, the card-type substrate 100 includes the frame 110 having the width 110W in accordance with configuration, i.e., design and weight criteria, as specified above. Furthermore, a thickness 110T of the frame 110 may be selected in accordance with overall design requirements so as to obtain the desired characteristics of the frame 110. For example, the thickness 110T may substantially correspond to a total thickness of the card-type substrate 100, thereby allowing, for a given width 110W, implementation of a maximum amount of material, which may be advantageous in obtaining additional weight for the card-type substrate 100 and also for providing for superior mechanical robustness with respect to an impact that laterally acts on the card-type substrate 100. It should be appreciated that in some illustrative embodiments, at least in some portions the thickness 110T of the frame 110 may vary, for instance by providing at least one portion of reduced thickness, as indicated by a portion 110R, thereby locally adapting the characteristics of the frame 110. For example, when providing the frame 110 on the basis of a material having a certain base conductivity, reducing the thickness of one or more portions may result in a reduced overall conductivity of the frame 110.

As already discussed above, using a conductive material as base material for the frame 110 may result in a negative influence on the RF performance of the antenna 130 and therefore, in some illustrative embodiments, specific conductive materials having a specified low conductivity, such as approximately 50 S/m (Siemens per meter), may be used, possibly in combination with other measures, such as an eddy current restricting component, so as to adjust the overall conductivity of the frame 110. Using a base material of reduced conductivity may thus allow providing the frame 110 as a closed loop, while nevertheless maintaining loss mechanisms, such as eddy currents, at an acceptable level, as discussed above.

Moreover, the card-type substrate 100 includes the electronic module 120 that is embedded in the substrate material 140. In some embodiments (not shown) the module 120 may include contact elements designed and positioned so as to allow direct contact with respective complementary contact elements of an external reader device. In this case, the card-type substrate 100 may communicate with the external reader device on the basis of direct contact and on the basis of wireless communication.

Furthermore, as illustrated, the antenna 130 may be provided in the form of conductive traces 130A and 130B, for instance implemented in the form of copper traces that are formed on an appropriate carrier material 131. As discussed above, the specific configuration of the antenna 130 is not restricted, as long as the respective configuration and design are compatible with the overall configuration of the card-type substrate 100 so as to enable the required RF performance.

Furthermore, in some embodiments the electronic module 120 may directly be connected to the antenna 130 (not shown), while in other cases, as for instance shown in FIGS. 1A and 1B, the electronic module 120 may be inductively coupled to the antenna 130. As will be discussed later on in more detail, the respective coupling of the electronic module 120 to the antenna 130 may have to be taken into consideration when selecting specific components or measures for adjusting the final RF performance of the card-type substrate 100.

FIGS. 2A and 2B schematically illustrate top views of card-type substrates 200A and 200B, respectively. In FIG. 2A the card-type substrate 200A the configuration of an electronic module 220 may substantially be identical to the corresponding configuration in the card-type substrate 200B of FIG. 2B. However, in FIG. 2A the lateral position of the configuration of the components 220, 230 with respect to a frame 210 may be different from the respective configuration as shown in FIG. 2B. As illustrated, distances 210F, 210E of the antenna 230 from respective long sides 210L of the frame 210 may be approximately 2.6 millimetres and 9.9 millimetres, respectively, thereby providing an asymmetric geometry with respect to the long sides 210L. It should be appreciated that in other embodiments the distances 210F, 210E may be selected differently in order to meet specific design criteria. Moreover, as also discussed above in the context of the frame 100 of FIG. 1A the frame 210 may have a varying width. In this case the distances 210F, 210E may represent a shortest distance between the respective segment of the frame 210 and the antenna 230.

On the other hand, the configuration in FIG. 2B provides for a substantially symmetric configuration of the antenna 230 with respect to the long sides of the frame 210, thereby obtaining a distance 210D of approximately 6.2 millimetres, wherein it should be appreciated that the overall lateral dimensions of the card-type substrates 200A, 200B may comply with standards for typical payment cards. It should be appreciated that generally increasing the distance 210D is advantageous in terms of RF performance so that a symmetric design with the distance 210D of 6 mm and greater is used in some illustrative embodiments.

FIG. 2C illustrates a table that correlates RF performance related metrics with the geometric configurations as shown in FIGS. 2A and 2B. That is, as illustrated, three RF related metrics or parameters are provided, such as resonance frequency of the antenna 230, intensity decrease due to coupling to a standardised coupling coil (not shown) in accordance with standardised procedures for evaluating RF performance, also referred to and known as S11 value, and a respective pass rate in a standardised EMVCo test. Basically, the pass rate value indicates RF intensity at a plurality of specified positions across the antenna. As is evident from FIG. 2C, the card-type substrate 200A has a resonance frequency of 14.5 MHz, while the S11 value is minus 1.3 and the pass rate is 63/91.

On the other hand, the card-type substrate 200B has a resonance frequency of 14.3 MHZ while the S11 value is minus 1.8 and the pass rate is 77/91. Consequently, for basically the same design and relative placement of electronic module 220 with respect to antenna 230 a significant improvement of the RF performance may be obtained for the substrate 200B, as indicated by the S11 value, wherein a higher negative value indicates superior RF performance. Also, the pass rate, here a higher value indicates better RF performance, is significantly increased compared to card-type substrate 200A. Consequently, a symmetric configuration of the antenna 230 with respect to the frame, at least in view of the long sides 210L results in superior overall RF performance. This concept increasing the distance 210D in a symmetric manner may efficiently be combined with any further measures for enhancing overall RF performance. It should be appreciated that respective metrics of FIG. 2C may reflect the results for a closed loop frame 210 formed of a conductive material, such as stainless steel, or any other metal or metal alloy may be considered appropriate for increasing weight and/or enhancing appearance of the card-type substrates 200A, 200B.

It should be appreciated that in other respects the card-type substrates 200A, 200B may have substantially the same configuration as discussed above with reference to the card-type substrate 100. Hence, the description of any such other aspects of a card-type substrate will be omitted.

FIGS. 3A to 3D schematically illustrate top views of respective card-type substrates 300A to 3000, wherein the card-type substrate 300A is provided without frame, while the card-type substrates 300B to 300D are formed on the basis of a conductive frame. Furthermore, the card-type substrates 300C and 300D may additionally be provided with an eddy current restricting component, which may significantly improve overall RF performance in the context of a frame that has a tendency of generating eddy currents upon being exposed to an electromagnetic field.

FIG. 3A schematically illustrates the card-type substrate 300A, which may be considered as a conventional card including an electronic module 320, an antenna 330 and any other components, which, for convenience, are not specifically described in this context, however, without a frame.

On the other hand, the card-type substrate 300B represents one illustrative embodiment, in which a frame 310 in combination with the module 320 and the antenna 330 is provided. In one illustrative embodiment, the frame 310 may be formed of a non-conductive material, such as a ceramic material, thereby substantially avoiding the generation of any eddy currents, so that basically a similar RF performance may be obtained as is obtained by the card-type substrate 300A. In the embodiment shown in FIG. 3B, however, the frame 310 may be provided in the form of a conductive material, such as stainless steel, any other metal or metal alloy so as to comply with design requirements for a specific application.

FIG. 3C schematically illustrates the card-type substrate 300C including the frame 310 formed of a conductive material and additionally including an eddy current restricting component 360, which may be implemented in the form of a slit 360C, which, thus, interrupts the closed loop design of the frame 310.

FIG. 3D schematically illustrates the card-type substrate 300D with the frame 310 made of a conductive material, as discussed above, wherein the eddy current restricting component 360 may be provided in the form of a resistive portion 360D, as is illustrated in a symbolic form by a cut out or slit of the frame 310 and resistor electrically bridging the slit or cut out. It should be appreciated, however, that in some illustrative embodiments the resistive portion 360D represents a slit in combination with an appropriate fill material so as to provide a mechanically stable closed loop frame, while in other cases, the base material of the frame 310 may include one or more portions of reduced thickness. For instance, as discussed in the context of FIG. 1B when referring to the portion of reduced thickness 110R, the overall conductivity of the frame 310 is reduced, even if the conductivity of the base material of the frame 310 is moderately high.

In still other illustrative embodiments, the resistive portion 360D may represent any portion, in which material characteristics of a base material may have been appropriately modified, for instance by incorporating, for instance by ion implantation, and the like, additional substances to the structure of the base material, by causing significant damage in the basic crystalline structure of the base material, and the like. Providing one or more resistive portions of the frame 310 by modifying the characteristics of the base material may advantageously preserve a certain mechanical stability, while still yielding a significant modification of the electrical behaviour. In this case, the processing of the frame 310 upon connecting the frame 310 to substrate material of the card-type substrate may still be based on handling a single frame component while nevertheless providing electrically very different portions of the frame 310.

With respect to any other components of the respective card-type substrates it may also be referred to the description in the context of FIGS. 1A to 2C above.

FIG. 3E schematically illustrates a table that correlates respective parameters or metrics that represent the RF performance of the respective antennas 330 with the various configurations.

As is evident, the substrate 300A in FIG. 3A, i.e., the card without any frame, and in particular without any conductive frame, has a resonance frequency of 13.3 MHz, while the S11 value is minus 7.3 and the pass rate is 89/91, thereby indicating good RF performance. As discussed above, when in some embodiments the frame 310 is provided on the basis of a non-conductive material, such as a ceramic material, substantially identical values for the RF related metrics are obtained. That is, for a configuration as shown in FIG. 3B, in which the frame 310 is formed of a non-conductive material basically the values of the first line of the table in FIG. 3B are obtained.

On the other hand, when providing the frame 310 as a metal frame of moderately high conductivity, such as stainless steel in order to address respective design criteria, a resonance frequency of 14.2 MHZ, an S11 value of minus 1.9 and a pass rate of 77/91 may be obtained. In many cases, these metrics may be considered as not being appropriate in representing the desired RF performance of the antenna 330. Therefore, in some illustrative embodiments, a conductive material with a conductivity of less than 50 S/m may be used so as to arrive at an acceptable RF performance. In one illustrative embodiment, the conductivity of the base material of the frame 310 provided in the form of a closed loop and having a configuration as for instance discussed above in the context of FIGS. 1A and 1B, the conductivity of the conductive material may be selected to be less than 50 S/m, such as 10 S/m, in some embodiments.

The configuration of FIG. 3C including the eddy current restricting component 360 in the form of the slit 360C for a frame 310 base material having a moderately high conductivity as typically associated with metal materials selected in view of certain design criteria, may result in a resonance frequency of 13.3 MHZ, an S11 value of minus 6.9 and a pass rate of 89/91, which is comparable to the configuration without a conductive frame as described and shown in the context of FIG. 3A.

Similarly, the configuration of FIG. 3D including the resistive portion 360 as the eddy current restricting component 360 results in the same resonance frequency with an S11 value of minus 4.6 and a pass rate of 90/91, thereby obtaining a desired RF performance. As discussed above, in some illustrative embodiments, when providing the eddy current restricting component 360 in the form of a slit, this slit may also be filled with any appropriate fill material with reduced conductivity, for example, a conductivity of less than 0.5 S/m, and/or the gap size of the slit 360B may be varied so as to obtain the desired metrics for the RF performance.

It should be appreciated that the embodiments shown in FIGS. 3A to 3D refer to an antenna, such as the antenna 330, that is formed of metal traces, such as copper traces, formed on a carrier material, for example, by an etch process. Substantially the same criteria and results also apply to an antenna that is formed by an embedded wire. Thus, irrespective of the technique used for forming the antenna, the frame 310 may be provided so as to achieve the required RF performance.

FIGS. 4A and 4B schematically illustrate top views of card-type substrates 400A, 400B, respectively, in which an eddy current restricting component is implemented in the form of a slit in combination with an appropriate fill material of insulating character or reduced conductivity. As shown, the card-type substrates 400A, 400B include respective frames 410 with respective eddy current restricting components 460A, 460B, respectively. In this case, these components 460A, 460B are represented by gaps of different size having incorporated therein a fill material of reduced conductivity, for example of 0.5 S/m or less, such as 0.2 S/m and less. Providing the slits with different gap sizes and filling the slits with appropriate fill materials results in superior mechanical stability of the entire frame, as discussed above, in particular when processing of the frames 410 as single components during manufacturing the card-type substrates 400A, 400B. That is, when mechanically fixing the frame to the substrate material the entire frame may be handled in the form of a single component. Furthermore, by allowing the usage of a fill material with a specified conductivity, that is, not requiring an insulating material, superior flexibility in designing the overall configuration of the frames 410 may be achieved. For example, the fill material may be selected with respect to optical appearance, mechanical robustness, connection behaviour with respect to the frame-based material, and the like, wherein not necessarily an insulating material may have to be used, when such an insulating material would not meet one or more of the desired criteria, such as optical appearance, and the like.

Figure 4C:
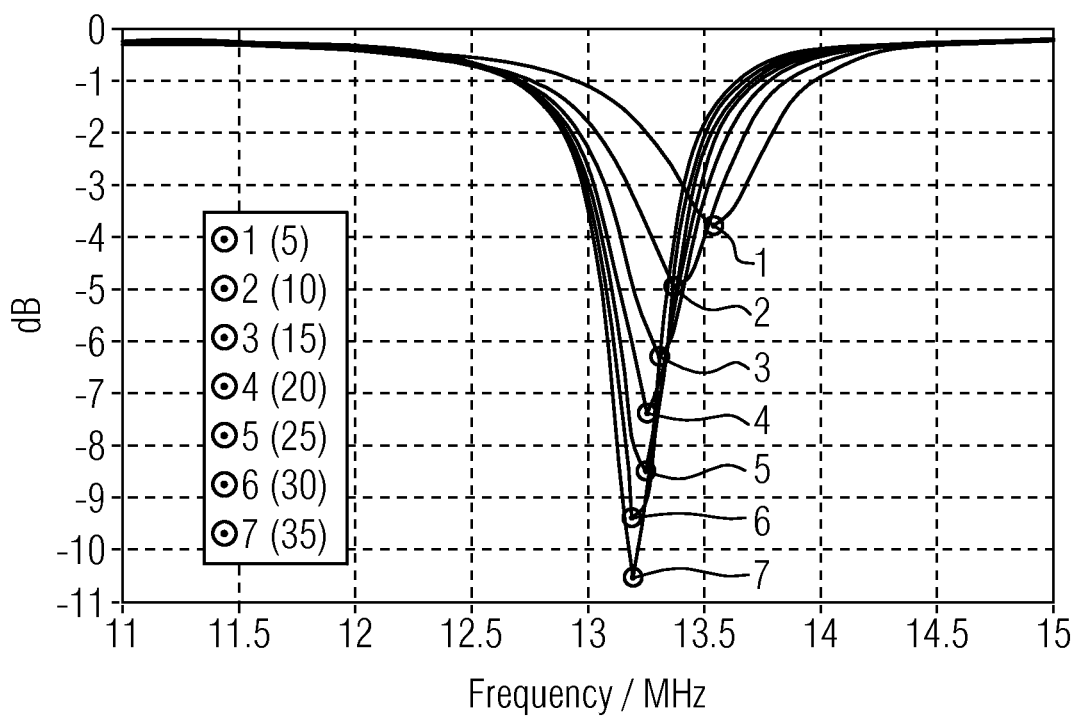
FIG. 4C schematically illustrates a representation of parameters or metrics for representing or evaluating the RF performance of the card-type substrate upon varying at least one feature, such as a gap size of a slit formed in the frame according to illustrative embodiments.

FIG. 4C schematically illustrates RF related metrics or parameters in relation to different gap sizes of the slits 460A, 460B. For example, curves 1 to 7 represent the respective RF metrics of the substrates 400A, 400B for varying gap sizes for otherwise identical parameters. That is, the gap sizes vary from 5 mm, represented by curve 1, to 35 mm, represented by curve 7. Consequently, in this case, a plurality of parameters and value ranges may be established that correspond to and quantify the respective RF performance of card-type substrates. In this manner, a collection of parameter values may be obtained, which may efficiently be used in designing the respective card-type information substrates that comply with one or more RF related metrics, which may be determined in advance so as to meet specific performance requirements.

Figure 5A:
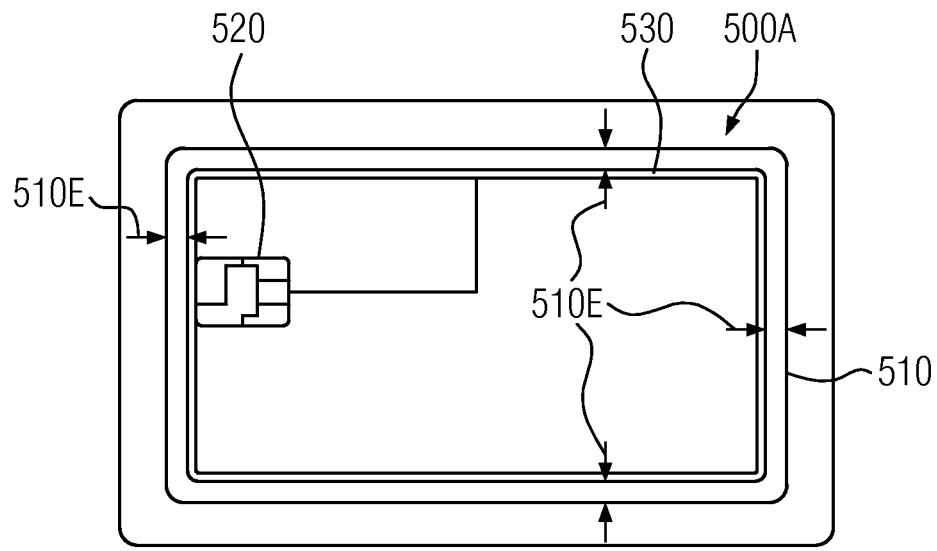
FIGS. 5A and 5B schematically illustrate top views of a design of card-type substrates with a direct electrical connection of an electronic module to an antenna according to still further illustrative embodiments.
Figure 5B:
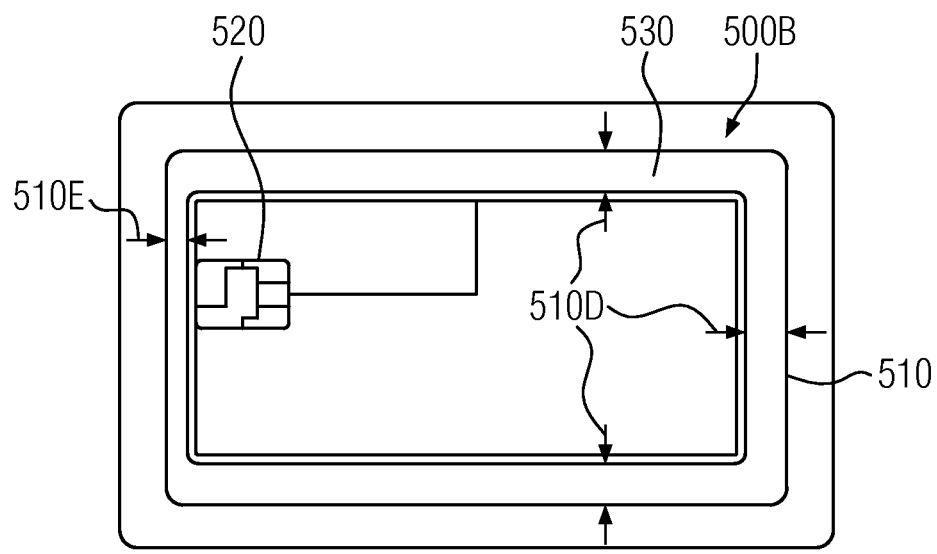

FIGS. 5A and 5B schematically illustrate top views of card-type substrates 500A, 500B, respectively, in which respective electronic modules 520 may be directly connected, i.e., connected by wire, to a respective antenna 530, thereby taking advantage of the fact that a direct connection between electronic module and antenna may result in superior RF performance compared to an inductive coupling of electronic module and the corresponding antenna. Consequently, by designing a frame 510 so as to impart increased weight and/or enhanced appearance to the respective substrates, the direct coupling may result in increased design flexibility, since respective measures for taking into consideration the influence of the frame 510, in particular, when comprising conductive material, may be increased, due to per se enhanced RF performance of the directly coupled electronic modules 520.

In FIG. 5A the distances 510E are selected to approximately 3 mm, whereas in FIG. 5B the distance 510E is approximately 3 mm and the distances 510D are approximately 5.5 mm. It should be appreciated that these values are merely design examples so as to demonstrate configuration with a wired connection between the module 520 and the antenna 530. In other cases the distances 510D, 510D may be selected differently in order to meet the design and RF requirements of a specific use case.

It is to be noted that any of the concepts for reducing the effect of dampening mechanisms, such as eddy currents, described above may appropriately be combined so as to achieve a desired RF performance in combination with specific design goals in terms of card weight and/or appearance and/or mechanical robustness of a card-type information substrate. That is, when, for instance, setting certain design aspects in advance with respect to providing a frame for a card-type substrate and by appropriately taking into consideration the characteristics of one or more of the materials to be used in forming the frame, one or more RF related metrics may be determined that have to be met.

Based on these one or more RF related metrics appropriate measures may then be taken as to adjust the RF behaviour finally to be achieved. For example, if it is determined in advance that specific requirements of a card-type substrate may be met on the basis of a non-conductive frame material, such as a ceramic material, the respective design of the antenna may be accomplished on the basis of lateral dimensions of the frame, while any influence of loss mechanisms, such as eddy currents, may substantially be neglected. If in other cases specific design criteria call for usage of a conductive material in the frame, and if specific dimensions of the frame may be preset in order to address specific requirements, then the respective parameter values obtained, as described above, may be consulted in providing an appropriate overall design that leads the predetermined one or more metrics with respect to RF behaviour.

For example, the implementation of a slit and/or providing appropriate fill material for the slit, and/or adjusting and/or selecting the basic conductivity of the frame base material and/or selecting the type of operative coupling between electronic module and the antenna and/or selecting a specific electronic module having a specified RF behaviour may be applied as design techniques, for instance based on respective parameter value ranges established in advance, so as to obtain a desired configuration that meets the necessary RF performance. In some illustrative embodiments the design of the card-type substrate may be performed in a highly automated manner by maintaining a database that stores respective RF related metrics in correlation with their physical implementations in the card, so that for instance upon entering one or more design goals into a corresponding system one or more alternative designs may be output based on the data and correlations stored in the database.

In illustrative embodiments, as will be described in the following, one or more additional "heavy" components, such as a metal containing slug or metal containing plate, may be incorporated in a central portion of the substrate, thereby further increasing the weight of the substrate, while maintaining superior RF performance. That is, the principles disclosed herein provide for the possibility of adapting the overall RF behaviour of a card-type information substrate, even if in addition to a heavy frame, for example, a metal containing frame, any further heavy components may be implemented. In particular, when a conductive material for the one or more additional heavy components, such as a metal containing slug, is used, the RF performance is still adjustable so as to meet the RF requirements for the specific use case.

Figure 6A:
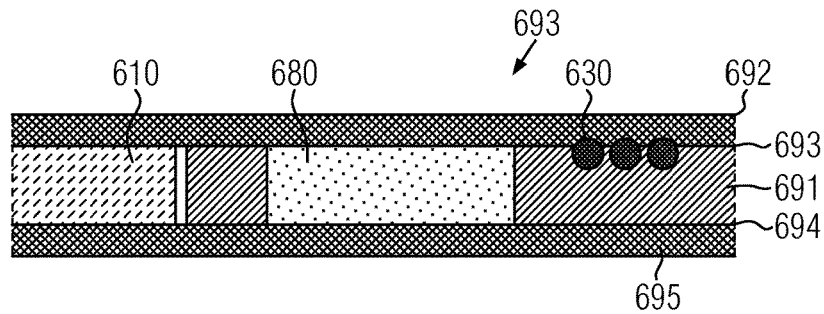
FIG. 6A schematically illustrates a cross-sectional view of a portion of a pre-form with a conductive frame and a metal containing plate according to illustrative embodiments.

FIG. 6A schematically illustrates a cross-sectional view of a pre-form 690 including a frame 610 and a metal containing plate 680 attached to a base material 691, which also carries an antenna 630. The pre-form 690, also frequently referred to a pre-laminate, may represent a pre-processed component used to form a card-type information substrate, such as the substrates described in the context of FIGS. 1 to 5 above, for example by laminating additional material sheets to the pre-form 690. Consequently, the pre-form 690 may have appropriate lateral dimensions and a thickness that are appropriate for forming a desired type of information substrate, such as a payment card, and the like.

The frame 610 may have substantially similar features as discussed above in the context of the frames 110, 210, 310, 410 and 510. That is, with respect to overall dimensions, material composition, respective configurations in terms of reduction of eddy currents and, thus, RF losses, and the like, the frame 610 may be configured, as discussed above. In the embodiment shown, the frame 610 may be provided in the form of a closed loop formed on the basis of stainless steel material.

The metal containing plate 680 is illustrated in the embodiment of FIG. 6A so as to have a thickness that is basically similar to the thickness of the frame 610, while in other cases, the metal containing plate 680 may have any appropriate configuration, such as portions of reduced material thickness, portions of increased resistivity obtained by forming slits and/or through holes, and the like with or without any additional fill material in the respective cavities, and the like so as to appropriately adjust the electrical behaviour of the metal containing plate 680. In one illustrative embodiment, metal containing plate 680 is formed of tungsten in order to obtain the desired high weight for a given lateral size and a given thickness of the metal containing plate 680.

It should be appreciated, however, that in other illustrative embodiments, the metal containing plate 680 may include other materials, such as gold, silver, platinum, lead, copper, and the like, or any combinations thereof.

The antenna 630 is illustrated as an "embedded wire" antenna, while in other illustrative embodiments any other type of antenna may be used, as for instance also described in the context of FIGS. 1 to 5. For example, the antenna 630 may represent any appropriate pattern of conductive traces on a desired carrier material that is formed of one or more suitable materials, such as copper, aluminium, alloys of any type, and the like. The antenna pattern may be formed on the carrier material, such as an epoxy based substrate, and the like, by deposition and etch techniques, by selective deposition of conductive material and/or by selective deposition of a masking material and subsequent etching, by selective electrodeposition or by non-patterned electro-deposition and subsequent removal or excess material by, for instance, etching, and the like. In other cases, the antenna may be provided as a self-carrying structure formed of an appropriate conductive material without requiring an additional carrier material. For example, the pattern of the antenna may be formed by additive deposition techniques, such as 3D printing, or the pattern may be formed on a preliminary carrier based on any of the above-specified techniques with sufficient mechanical stability and may be removed from the preliminary carrier prior to being inserted into the preform 690, thereby also representing a "kind" of wire embedding.

The base material 691 of the pre-form 690 may be any appropriate type of material, such as polycarbonate, PVC, and the like, in order to allow attachment of the frame 610, the metal containing plate 680 and the antenna 630.

In the embodiment shown in FIG. 6A, the pre-form 690 additionally includes a first disconnecting layer 692 that is attached to the other components of the pre-form 690 by an adhesive layer 693. The disconnecting layer 692 may provide for a well-defined surface of the pre-form 690 during the further processing so that the different behaviours of the "core" components of the pre-form 690, such as the frame 610, the metal containing plate 680, the antenna 630 and the base material 691, may not unduly affect respective lamination processes, i.e. the application of elevated temperatures and increased pressure so as to adhere further material sheets to the pre-form 690 in order to obtain a completed card-type information substrate. In some illustrative embodiments, the disconnecting layer 692 may be provided in the form of a rigid material, such as epoxy glass or PET, which will not easily soften or flow onto or into respective steps formed by thickness differences of materials of different components, for instance between the base material 691 and the components 680, 610. Consequently, when subjected to elevated temperatures and increased pressure during a lamination process, the disconnecting layer 692, covering the antenna 630, the frame 610, the base material 691 and the metal containing plate 680, may respond in a highly uniform manner so as to allow a reliable and highly predictable process result upon laminating one or more material layers to the disconnecting layer 692. Thus, the disconnecting layer 692 basically decouples the core components of the pre-form 690 from the lamination parameters and provides for a planar and smooth surface of the final card-type substrate.

In the embodiment shown in FIG. 6A, a second disconnecting layer 695 may be attached to the pre-form 690 by a second adhesive layer 694, thereby also achieving the similar characteristics, discussed above, with respect to the further processing at the opposite surface of the pre-form 690.

Figure 6B:
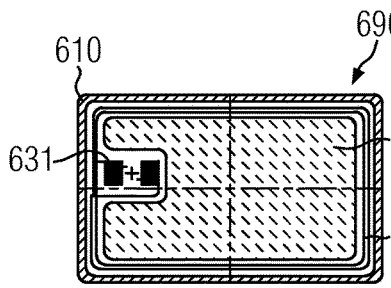
FIG. 6B schematically illustrates a top view of the pre-form of FIG. 6A.

FIG. 6B schematically illustrates a top view of the pre-form 690 with the disconnecting layers 692, 695 not shown or not provided. As illustrated, the frame 610 is illustrated as a closed loop configuration so as to delineate an inner area, in which the metal containing plate 680 and the antenna 630, including respective contact pads 631, are arranged. For convenience, the base material 691 is not illustrated in FIG. 6B.

Figure 6C:
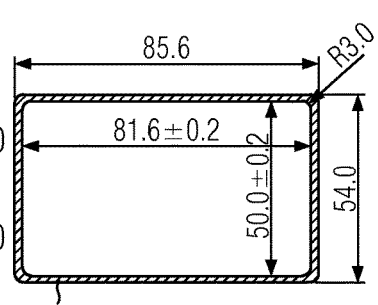
FIGS. 6C and 6D schematically illustrate top views of the frame and the metal containing plate, respectively, of the pre-form of FIG. 6B according to a specific configuration.
Figure 6D:
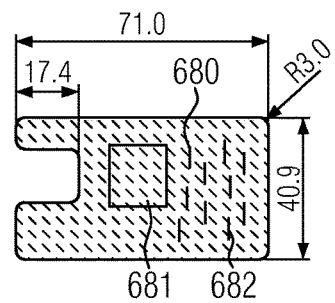

FIG. 6C schematically illustrates a top view of the frame 610 with exemplary dimensions, which may be appropriate for a standard payment card, wherein a width of the respective frame portions may appropriately be selected so as to obtain a desired RF performance in combination with the antenna 610 as shown in FIG. 6B and the metal containing plate 680 as shown in FIG. 6D. That is, the lateral dimensions and the shape of the metal containing plate 680 may be selected in combination with the lateral dimensions of the frame 610 so as to obtain a desired RF performance for given material characteristics and given material thickness values.

With respect to appropriately selecting dimensions, material characteristics, and the lateral shape of the frame 610 and in particular of the metal containing plate 680, it is also referred to the concepts as disclosed above. That is, a required RF performance may be determined on the basis of simulation and/or experiment by varying the lateral shape and dimensions, for given materials, of the frame 610 and the plate 680, while also the overall configuration of the antenna 610 may be taken into account.

For example, in the embodiment illustrated in FIG. 6D the frame width and lateral size and shape of the metal containing plate 680 are selected so as to allow a lateral enclosure of the contact pads 631 at three sides. Moreover, in some illustrative embodiments, the metal containing plate 680 may be provided as a continuous single piece of material, such as a single tungsten plate, and the like, which may readily be fabricated on the basis of well established manufacturing techniques.

In other cases, the frame 610 may receive appropriate means so as to reduce overall resistivity of the frame 610, as also discussed above, which may contribute to superior RF performance compared to a closed loop configuration without additional measures for reducing the overall conductivity of the frame 610, if other materials may need to be selected for the frame 610 and/or the plate 680.

Additionally or alternatively to providing measures for reducing overall conductivity of the frame 610, the conductivity of the metal containing plate 680 may be adjusted, for instance, by incorporating portions or "windows" of reduced conductivity 681 with any appropriate lateral shape and size. For example, the portion(s) 681 may represent a portion of reduced material thickness, or a portion of the original metal material may be replaced with a material of reduced conductivity, and the like. Additionally or alternatively, one or more slots 682 may be incorporated into plate 680, wherein the slot(s) 682 may substantially completely extend through the entire thickness of the plate 680, thereby also reducing overall conductivity of the plate 680. For example, by selecting an appropriate geometric configuration of the slots 682 the occurrence of eddy currents may significantly be reduced in the plate 680.

It should be appreciated that the slots 682 may be formed with a reduced width, thereby not significantly affecting the overall weight of the plate 680, while nevertheless significantly affecting the electrical responsiveness of the plate 680. In still other illustrative embodiments, the plate 680 may be provided in the form of a plurality of individual plates that may be separated so as to reduce the overall conductivity in order to enhance RF performance of the antenna 610 by reducing the dampening effect of the plate 680.

Figure 6E:
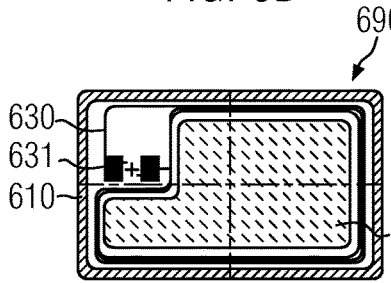
FIGS. 6E, 6F, 6G schematically illustrate top views of, respectively, the pre-form of FIG. 6A, the frame contained therein and the metal containing plate according to further illustrative embodiments.
Figure 6F:
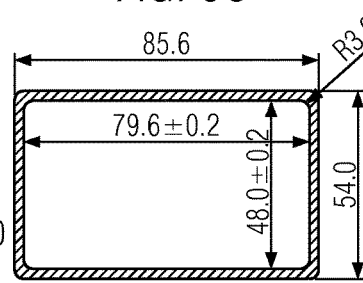
Figure 6G:
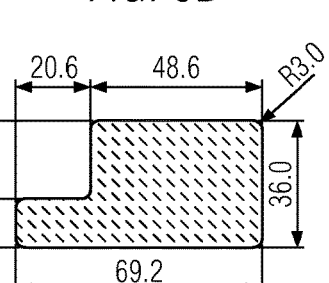

FIG. 6E schematically illustrates a top view of the pre-form 690 including the frame 610, the antenna 630 and the metal containing plate 680, wherein again for convenience the base material 691 is not illustrated. In this embodiment, the frame 610 may have an increased width, as shown in FIG. 6F, whereas the overall area of the metal containing plate 680 may be somewhat reduced, as shown in FIG. 6G, compared to the configuration of the plate 680 of FIG. 6D. On the other hand, the lateral shape of the plate 680 is selected so as to enable a connection of the contact pads 631 to the antenna wires on the basis of an increased area that is not occupied by the plate 680.

As discussed above, the determination of the lateral sizes and shapes of the frame 610 and the metal containing plate 680 may be selected in accordance with RF performance and customer specific requirements for the further processing of the pre-form 690.

Figure 6H:
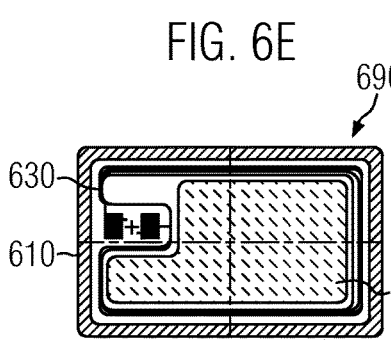
FIGS. 6H, 6I, 6J schematically illustrate top views of, respectively, the pre-form of FIG. 6A, the frame contained therein and the metal containing plate according to further illustrative embodiments.

FIG. 6H schematically illustrates a top view of the pre-form 690, wherein the respective configuration is similar to the configuration as shown in FIG. 6E.

Figure 6I:
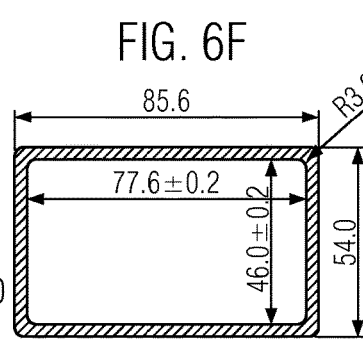
Figure 6J:
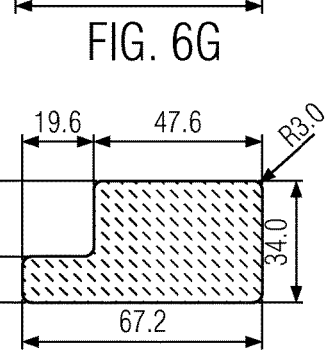

As illustrated in FIG. 6I the frame 610 may have an even further increased width compared to the frame 610 of FIG. 6E, while on the other hand, the total area of the plate 680 may be reduced compared to the total area of the plate 680 of FIG. 6G, thereby also achieving the required RF performance.

It should be appreciated that also for the pre-forms 690 of FIGS. 6E and 6H appropriate measures may be applied with respect to the electrical characteristics of the frame 610 and/or the metal containing plate 680, as for instance discussed above with reference to FIGS. 6B, 6C and 6D.

As a consequence, for the dimensions of the pre-form 690 compatible with a standard payment card, as shown in FIGS. 6, the lateral dimensions of the frame 610, i.e., the width thereof and, thus, the lateral size thereof, and the lateral size and shape of the plate 680 in combination with the configuration of the antenna 630 may be selected so as to achieve the desired RF performance and obtain a weight of the final card-type substrate. On the other hand, modifications may be made to the frame 610 and/or the plate 680, as discussed above, if further tuning of the RF characteristics may be required or desired. To this end, similar techniques for evaluating the RF performance for varying configurations of the frame 610 and/or the plate 680 may be applied as described above in the context of FIGS. 1 to 5.

Moreover, it should be appreciated that the lateral dimensions given in FIGS. 6B to 6J represent examples only and these lateral dimensions may appropriately be adapted to the specific use case. Furthermore, variations in shape, thickness and size may be determined for the frame and/or the metal containing plate based on evaluation techniques, as specified above in order to balance weight, optical appearance and haptic characteristics against required RF performance of the antenna. Furthermore, it should be appreciated that also the characteristics of an electronic module to be attached to the pre-form in a later manufacturing stage may be taken into account upon designing the pre-form in order to obtain the required performance of a finished card-type information substrate, as also discussed above.

On the basis of the pre-form 690 a card-type information substrate may be produced by adding further components, such as an electronic module, which may directly be connected to the antenna 630 by means of the contact pads 631, and by adding further material sheets by a respective lamination process, wherein the disconnecting layers 692, 695, if provided, may result in a well defined interface for the further processing.

Figure 7A:
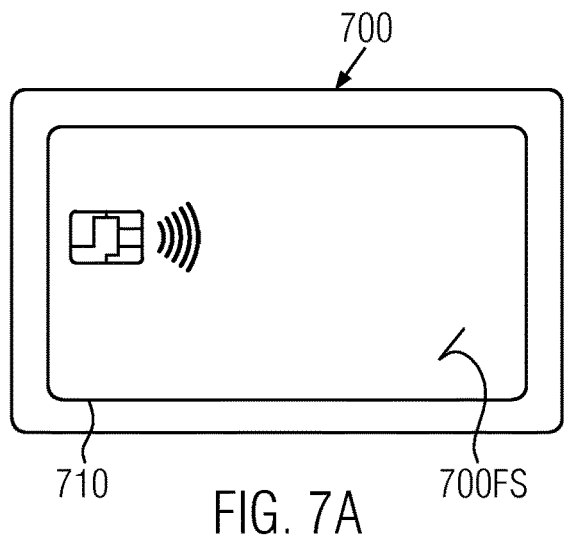
FIGS. 7A and 7B schematically illustrate top views of the front side and the backside, respectively, of a card-type information substrate including a respective pre-form as illustrated in FIGS. 6A-6J without a disconnecting layer.

FIG. 7A schematically illustrates a card-type information substrate 700 with a front surface 700FS thereof, for instance in the form of a payment card or any other information substrate, after completing a manufacturing process on the basis of the pre-form 690 (cf. FIGS. 6A to 6J). The card-type substrate 700 may be obtained on the basis of the pre-form 690, in which the disconnecting layers 692 and 695 are omitted, thereby resulting in a more or less pronounced optical and haptic appearance of a frame 710, since, as discussed above, the respective core components of the pre-form 690, such as the frame, the metal containing plate and the antenna, may have a different behaviour during a lamination process as other materials, such as the base material of the pre-form 690 and other materials, such as polycarbonate, PVC, and the like, as may typically be used for forming further components of the card-type information substrate 700. It should be appreciated that the substrate 700 has incorporated therein an electronic module, for instance, a module as also discussed and described in the context of FIGS. 1 to 5, thereby providing the required functionality for the substrate 700, and in particular providing for wireless communication.

Figure 7B:
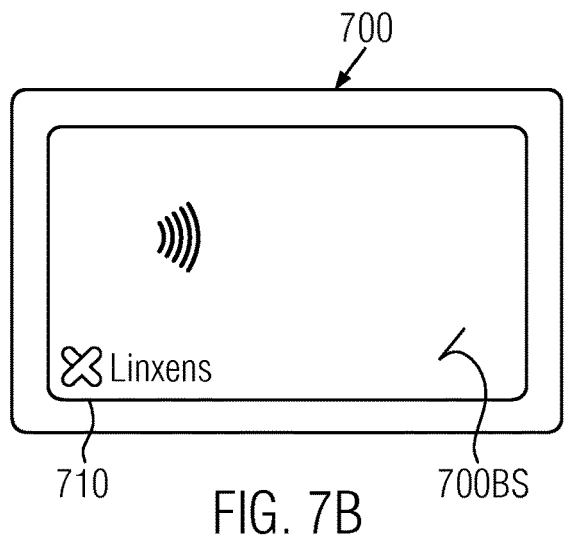

FIG. 7B schematically illustrates the substrate 700 with its back surface 700BS, wherein the frame 710 may also be recognizable due the absence of the disconnecting layers, as discussed above.

Due to the highly symmetric configuration of the substrate 700, a wireless communication may be accomplished via the front surface 700FS and the back surface 700BS. Consequently, superior handling of the card-type information substrate 700 may be accomplished due to a substantially symmetric behaviour of the surfaces 700FS, 700BS with respect to wireless communication.

Figure 8A:
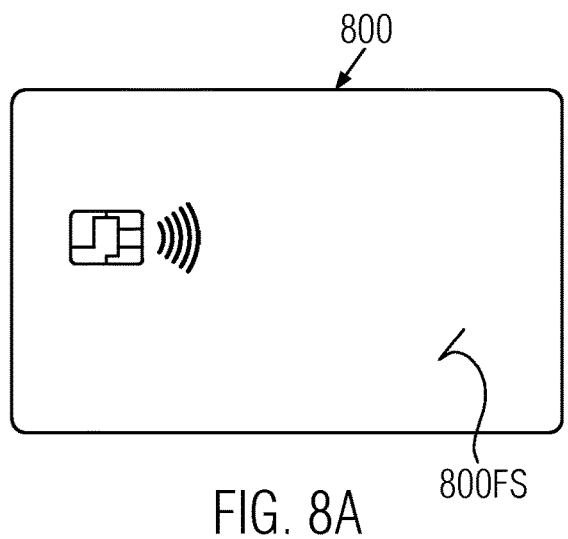
FIGS. 8A and 8B schematically illustrate top views of the front side and backside, respectively, of a card-type information substrate including a pre-form with disconnecting layers as shown in FIG. 6A.
Figure 8B:
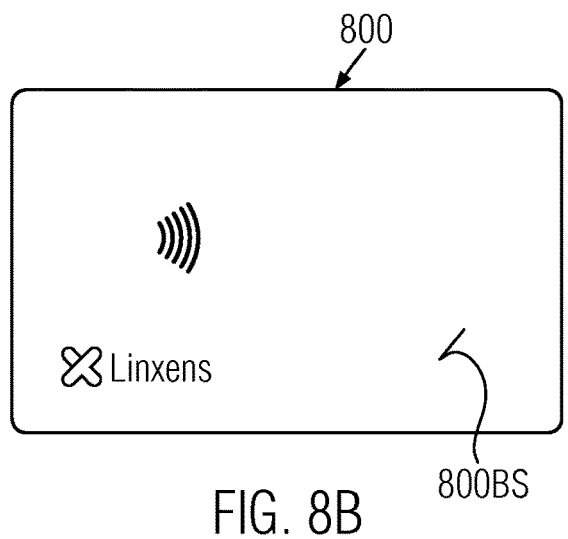

FIG. 8B schematically illustrates the card-type information substrate 800 with its back surface 800BS, wherein also optical and haptic characteristics of the frame may be less pronounced due to the presence of the disconnecting layer 695, resulting in a plane and smooth surface.

FIG. 8A schematically illustrates a card-type information substrate 800 having incorporated therein a pre-form, such as the pre-form 690 of FIG. 6A, wherein contrary to the substrate 700, the pre-form 690 may be provided with the disconnecting layer 692. Consequently, upon forming the substrate 800, a highly consistent behaviour during the lamination process may be achieved, resulting in plane and smooth front surfaces 800FS, since the disconnecting layers 692, 695 may provide for appropriate interface characteristics during the lamination process. Therefore, the respective frame may be less pronounced in terms of optical and haptic characteristics.

Consequently, by incorporating a frame made of heavy materials, such as metal containing materials, ceramic, and the like, in particular made of stainless steel, in combination with a metal containing plate, a desired high total weight of a card-type information substrate may be achieved, while in particular, the provision of a pre-form significantly relaxes any constraints of the manufacturing process for forming the card-type information substrate, in particular, when the pre-form is provided with one or more disconnecting layers.

Similarly, as discussed above in the context of the substrate 700, wireless communication may be achieved through both the front surface 800FS and the back surface 800BS.

The invention claimed is:

1. A pre-form of a card-type information substrate, comprising
    a frame formed around a perimeter of a base material, said material of said frame having a higher specific weight compared to the base material in the form of plastic and thus imparting increased weight to said pre-form;
    a metal containing plate provided within an outline of said frame and imparting additional weight to said pre-form; and
    an antenna positioned within said outline of said frame and configured to enable wireless communication;
    wherein a thickness of said frame corresponds to a combined thickness of said base material and said antenna, and to a total thickness of said pre-form of said card-type information substrate;
characterized in that
said pre-form further comprises:
a first disconnecting layer covering, said frame, said base material, said metal containing plate and said antenna, said first disconnecting layer being attached to said frame and forming a first surface of said pre-form,
    wherein said first disconnecting layer comprises a rigid material which does not soften or flow onto or into respective steps formed by thickness differences of the materials of said frame, said base material, said metal containing plat plate or said antenna during lamination of further components to said pre-form.

2. The pre-form of claim 1, wherein said frame contains a metal material.

3. The pre-form of claim 2, wherein said first disconnecting layer is attached by a first adhesive layer.

4. The pre-form of claim 1, further comprising a second disconnecting layer covering, at a second surface of said pre-form opposite to said first surface, said frame, said base material and said metal containing plate.

5. The pre-form of claim 4, wherein said second disconnecting layer is attached by a second adhesive layer.

6. The pre-form of claim 1, wherein at least a portion of said frame is formed of a conductive material, in particular stainless steel.

7. The pre-form of claim 1, wherein said frame is formed of a non-conductive material.

8. The pre-form of claim 1, further comprising an eddy current restriction component configured and arranged so as to restrict eddy currents in at least one of said frame and said metal containing plate.

9. The pre-form of claim 8, wherein said eddy current restriction component comprises one or more slits formed in at least one of said frame and said metal containing plate.

10. The pre-form of claim 8, wherein said eddy current restriction component comprises a resistive portion connected to at least one of said frame and said metal containing plate and having a lower specific conductivity compared to a conductivity of a remaining material of said at least one of the frame and the metal containing plate.

11. The pre-form of claim 10, wherein said resistive portion comprises a slit and a fill material of reduced conductivity.

12. The pre-form of claim 10, wherein said resistive portion is provided as part of said at least one of the frame and the metal containing plate.

13. The pre-form of claim 1, wherein said frame forms a closed loop.

14. The pre-form of claim 1, wherein said metal containing plate is a continuous single piece of material.

15. The pre-form of claim 1, wherein said metal containing plate comprises two or more metal containing plates.

16. The pre-form of claim 1, wherein at least one of said frame and said metal containing plate is conductive and includes at least one portion of reduced conductivity.

17. The pre-form of claim 16, wherein said at least one portion of reduced conductivity includes a region of reduced material thickness.

18. The pre-form of claim 1, wherein said metal containing plate contains tungsten.

19. A card-type information substrate, comprising a substrate material made of plastic;
    an electronic module provided in said substrate material; and
    a pre-form attached to said substrate material, wherein said antenna of said pre-form is operatively connected to said electronic module to perform wireless communication,
    wherein said pre-form comprises:
        a frame formed around a perimeter of a base material, said material of said frame having a higher specific weight compared to the base material in the form of plastic and thus imparting increased weight to said pre-form;
        a metal containing plate provided within an outline of said frame and imparting additional weight to said pre-form,
        wherein said antenna is positioned within said outline of said frame and is configured to enable wireless communication;
        wherein a thickness of said frame corresponds to a combined thickness of said base material and said antenna, and to a total thickness of said pre-form of said card-type information substrate;
        a first disconnecting layer covering, said frame, said base material, said metal containing plate and said antenna, said first disconnecting layer being attached to said frame and forming a first surface of said pre-form,
        wherein said first disconnecting layer comprises a rigid material which does not soften or flow onto or into respective steps formed by thickness differences of the materials of said frame, said base material, said metal containing plate or said antenna during lamination of further components to said pre-form.

20. A card-type information substrate according to claim 19, wherein said frame of said pre-form is formed around the perimeter of said substrate material, wherein a thickness of said frame corresponds to a total thickness of said card-type information substrate and said frame material has a higher specific weight compared to the base material in the form of plastic, so that said frame imparts at least one of increased weight and superior optical appearance to said card-type information substrate.

21. A method of forming a pre-form of a card-type information substrate comprising:
    selecting a substrate material;
    providing a frame around a perimeter of said substrate material, wherein said frame material has a higher specific weight compared to the base material in the form of plastic, thus imparting increased weight to said pre-form;
    providing said substrate material with an electronic module; providing said substrate material with an antenna, wherein a thickness of said frame corresponds to a combined thickness of said base material and said antenna, and to a total thickness of said pre-form of a card-type information substrate;
    providing said substrate material with a metal containing plate;
    characterized in that
    said method further comprises
        attaching a first disconnecting layer to said frame so as to cover said frame, said base material, said metal containing plate and said antenna and to form a first surface of said pre-form,
        wherein said first disconnecting layer comprises a rigid material which does not soften or flow onto or into respective steps formed by thickness differences of the materials of said frame, said base material, said metal containing plate or said antenna during lamination of further components to said pre-form.

22. A method for forming a card-type information substrate comprising:
    forming a pre-form of a card-type information substrate according to the method of claim 21;
    providing a substrate material made of plastic;
    providing an electronic module provided in said substrate material;
    laminating said pre-form, said substrate material and said electronic module.

23. The method according to claim 22, further comprising the following steps:
    determining at least one metric that represents a desired radio frequency performance of said antenna; selecting at least one of a total conductivity of said frame, a position of said antenna within an outline of said frame and a performance of said electronic module on the basis of said at least one metric so as to achieve said desired radio frequency performance; and
    selecting at least one of a size and a shape of a metal containing plate to be provided with the outline of said frame so as to achieve said desired radio frequency performance.

* * * * *